United States Patent [19]
Yoshihara

[11] Patent Number: 5,617,179
[45] Date of Patent: Apr. 1, 1997

[54] RECORDING APPARATUS FOR SELECTIVELY RECORDING AND RETRIEVING OBJECT IMAGES ON A PLURALITY OF RECORDING MEDIA

[75] Inventor: Yoshihiko Yoshihara, Yokohama, Japan

[73] Assignee: Canon Kabushiki Kaisha, Tokyo, Japan

[21] Appl. No.: 317,529

[22] Filed: Oct. 4, 1994

[30] Foreign Application Priority Data

Oct. 8, 1993 [JP] Japan .................................... 5-275980

[51] Int. Cl.$^6$ .......................... G03B 27/32; G03B 27/465
[52] U.S. Cl. .................. 355/40; 355/46; 355/18
[58] Field of Search ................... 355/39, 40, 41, 355/46, 23, 24, 18; G03B 27/32, 27/465

[56] References Cited

U.S. PATENT DOCUMENTS

| | | | |
|---|---|---|---|
| 4,737,825 | 4/1988 | Davis | 355/54 |
| 4,783,681 | 11/1988 | Tanaka et al. | 355/202 |
| 5,146,264 | 9/1992 | Shirai et al. | 355/27 |
| 5,208,627 | 5/1993 | Yoshihara et al. | 355/23 |
| 5,337,119 | 8/1994 | Tanibata | 355/40 |

*Primary Examiner*—Arthur T. Grimley
*Assistant Examiner*—Herbert Kerner
*Attorney, Agent, or Firm*—Fitzpatrick, Cella, Harper & Scinto

[57] ABSTRACT

A recording apparatus for recording images on a plurality of recording media, including an image recording unit for recording images on the plurality of recording media. The apparatus also includes a control unit for controlling the image recording unit to sequentially record images on one recording medium of the plurality of recording media, and for controlling the image recording unit to record at least one image on each of the one recording medium and at least one other recording medium of the plurality of recording media after recording a predetermined number of images on the one recording medim. The apparatus also includes a unit for recording retrieval information on the plurality of recording media.

19 Claims, 13 Drawing Sheets

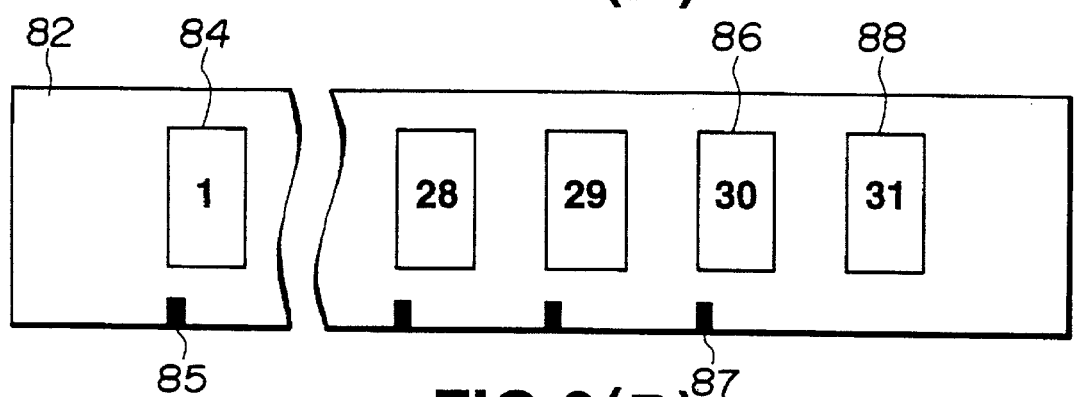
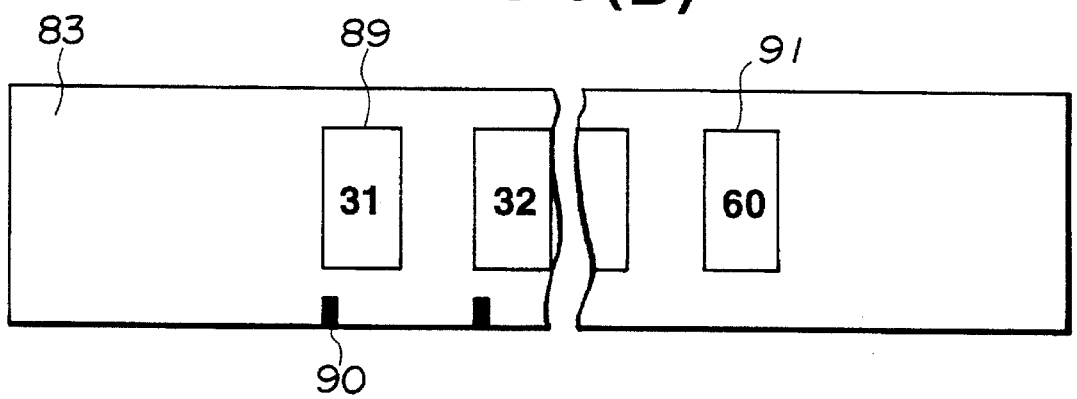
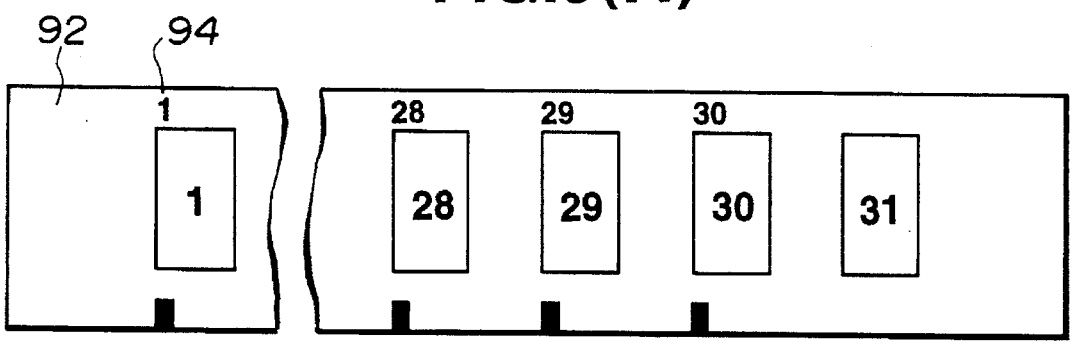
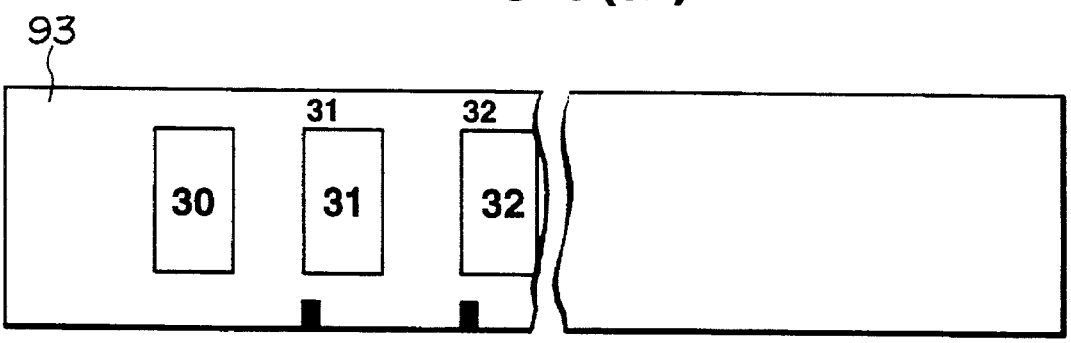

RECORDING APPARATUS FOR SELECTIVELY RECORDING AND RETRIEVING OBJECT IMAGES ON A PLURALITY OF RECORDING MEDIA

BACKGROUND OF THE INVENTION

1. Field of the Invention

This invention relates to a recording apparatus for recording objects on recording media, such as microfilms or the like.

2. Description of the Related Art

Flow cameras are known as typical recording apparatuses of this kind. A description will now be provided of a flow camera.

A flow camera is an automatic photographing apparatus, in which documents (objects) to be preserved in the form of microfilms, such as bills, checks, stock certificates, general documents and the like, are sequentially fed into the apparatus, the images of the objects are sequentially photographed on a long film, and the photographed objects are discharged outside the apparatus. Such an apparatus can record a large number of object images on long films, serving as recording media, set within the apparatus at a high speed.

Accordingly, such apparatuses are used for providing microfilms for preserving and arranging various kinds of objects in, for example, financial agencies, such as banks and the like, and general offices.

For particular utilization objectives, such as presering of important documents, the necessity of frequent retrieval operations, and the like, two-shot flow cameras are known. In these two-shot flow cameras, in consideration of safety in the storage of films, and the like, two cameras, serving as recording means, are set at a photographing operation, and the same object images can be photographed by the two cameras on two respective films, serving as recording media.

However, in the above-described conventional two-shot photographing apparatus, it is not always necessary to photograph each object image on two films, depending on the user's intention, the kind of objects to be photographed, or the utilization objective of the microfilms, serving as recording media. For example, when preservation for a very long time period is not required, it is only necessary to photograph object images on a single roll of original film from the viewpoint of economizing films.

Recently, there has been a demand for a flow camera that can process a larger number of objects more continuously at a higher speed and in a shorter time period.

In order to respond to this demand, an apparatus has been proposed in U.S. Pat. No. 5,208,627, in which images are continuously photographed on films, serving as recording media, by alternately using a plurality of cameras. In this apparatus, however, correlated images are, in some cases, photographed on two different films, and the relationship between the final image on one film and the leading image on another film is uncertain, thereby causing inconvenience when utilizing the films after photographing the images.

That is, images, which belong to one group, are, in some cases, photographed on different recording media, thereby causing confusion when retrieval is performed later on, causing inconvenience when confirming an image next to the final image of a film or an image preceding the leading image of a film, or causing the inconvenience that correlation and continuity between two films cannot be confirmed.

SUMMARY OF THE INVENTION

It is an object of the present invention to solve the above-described problems.

It is another object of the present invention to provide a recording apparatus in which correlation between two recording media can be easily determined, thereby causing easy control of recorded images, and no inconvenience and confusion when retrieval is performed later on.

According to one aspect, the present invention relates to a recording apparatus for recording images on a plurality of recording media. The apparatus comprises image recording means for recording images on the plurality of recording media, and control means for controlling the image recording means to sequentially record images on one recording medium of the plurality of recording media, and for controlling the image recording means to record at least one image on each of the one recording medium and at least one other recording medium of the plurality of recording media after recording of a predetermined number of images on the one recording medium.

According to another aspect, the present invention relates to a recording apparatus for recording images on a plurality of recording media. The apparatus comprises image recording means for recording images on the plurality of recording media, and control means for controlling the image recording means to sequentially record images on one recording medium of the plurality of recording media, and for controlling the image recording means to record a next sequential image each of the one recording medium and another recording medium of the plurality of recording media after a remaining amount of an unrecorded region of the one recording medium has reached a predetermined amount.

According to still another aspect, the present invention relates to a recording apparatus for recording images on a plurality of recording media. The apparatus comprises first recording means for recording images on the plurality of recording media, and second recording means for recording retrieval information of different types on the plurality of recording media. The apparatus also comprises control means for controlling the first and second recording means so as to sequentially record images and retrieval information on one recording medium of the plurality of recording media, and to selectively record images on another recording medium of the plurality of recording media in accordance with the different types of retrieval information.

According to yet another aspect, the present invention relates to a recording apparatus for recording images on at least two recording media. The apparatus comprises optical means for projecting an image onto at least one of the at least two recording media. The apparatus also comprises control means for controlling the optical means so as to sequentially project images on one recording medium of the at least two recording media, and for performing switching of the optical means so as to project a next sequential image onto each of the one recording medium and another of the at least two recording media when a remaining amount of a recordable region of the one recording medium has reached a predetermined amount.

The retrieval information comprises the address numbers of images recorded on the recording media, bar codes, marks and the like. A desired image within a recording medium can be retrieved based on the retrieval information.

The foregoing and other objects, advantages and features of the present invention will become more apparent from the following description of the preferred embodiments taken in conjuction with the accompanying drawings.

BRIEF DESCRIPTION OF THE DRAWINGS

FIGS. 8(A) and 8(B) are diagrams illustrating films, on which images are photographed, according to the first embodiment;

FIGS. 9(A) and 9(B) are diagrams illustrating films, on which images are photographed, according to a second embodiment of the present invention;

DESCRIPTION OF THE PREFERRED EMBODIMENTS

A description will now be provided of a first embodiment of the present invention with reference to FIGS. 1 through 8.

Figure 1:
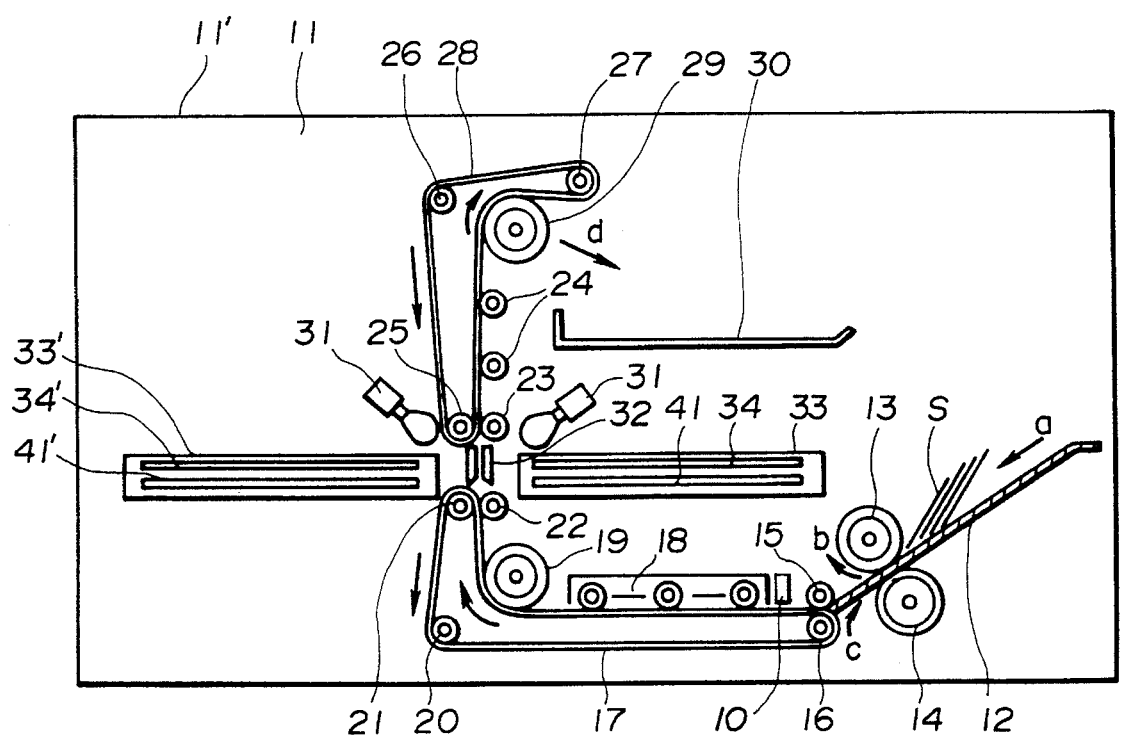
FIG. 1 is a schematic diagram illustrating a configuration of a recording apparatus according to a first embodiment of the present invention.

FIG. 1 is a schematic side view illustrating an object conveying system of a recording apparatus 11. the recording apparatus has a main body generally indicated in FIG. 1 as 11'. In FIG. 1, when objects S have been placed on a downward-inclined sheet-feed mount 12, the objects S move toward the direction of arrow a due to gravity, and are individually separated and fed by a sheet-feeding roller 13, which rotates in the direction of arrow b, and a separation roller 14, which rotates in the direction of arrow c.

A lower belt 17 is stretched between belt rollers 16 and 21, and an appropriate tension is provided for the lower belt 17 by a tension roller 20. Each of the separated and fed objects S is conveyed on the lower belt 17 by the rotation of a lower-belt-driving roller 19.

An idler roller 15 and a guide unit 18 press and hold the object S against the lower belt 17. An object sensor 10 detects the object S, and is used for calculating the number of photographed objects.

The object S is conveyed from a horizontal direction to a vertical direction by the lower belt 17, and passes through object guide glass 32. Two surfaces of the object S are simultaneously illuminated by a pair of illuminating lamps 31. Nip rollers 23 and 22 are provided, respectively, above and below the guide glass 32. An upper belt 28 is stretched between belt rollers 25 and 27, and an appropriate tension is provided for the upper belt 28 by a tension roller 26. The object S passing through the guide glass 32, is conveyed on the upper belt 28 by the rotation of an upper-belt-driving roller 29. Idler rollers 24 press and hold the object S against the upper belt 28.

The conveying path of the object S is switched from a vertical direction to a horizontal direction by the upper belt 28. The object S further proceeds in the direction of arrow d, and is discharged onto a stacker 30.

First mirrors 33 and 33', respectively having an angle of 45° to the right and to the left with respect to the plane of the object S moving in the vertical direction, are respectively disposed at symmetrical positions at two sides of the object guide glass 32, and thereby constitute an exposing portion. As are the shafts of the above-described rollers for conveying the object S, the mirrors 33 and 33' are supported on a base structure (not shown) within the main body 11' of the recording apparatus 11.

Figure 2:
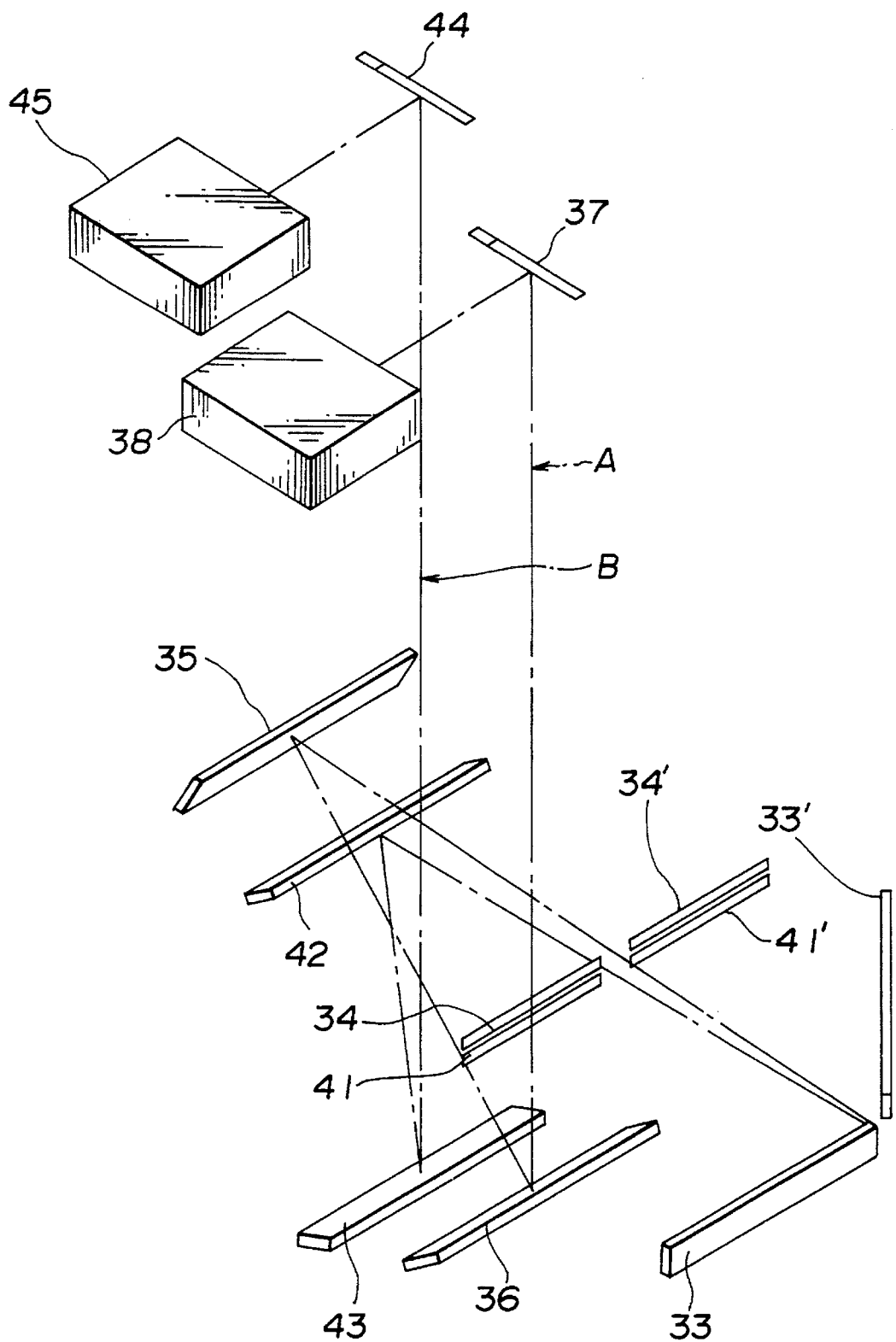
FIG. 2 is a schematic perspective view of an optical system of the apparatus shown in FIG. 1.

FIG. 2 is a perspective view illustrating the configuration of mirrors constituting optical systems of the recording apparatus 11. In the exposing portion, light beams (illustrated by broken lines) representing the images of the two surfaces of the object S illuminated by the pair of illuminating lamps 31 are reflected by the first mirrors 33 and 33'. For clarity of illustration, light beams are depicted in FIG. 2 as reflecting only from first mirror 33; however, light beams also reflect from first mirror 33' in like fashion (not shown). In a first optical system generally indicated as A for projecting images onto a first camera 38, serving as recording means for recording images and the like on a recording medium, the light beams pass through slits 34 and 34', and are reflected obliquely downward by a second mirror 35. The light beams are again reflected upward by a third mirror 36, and are reflected forward by a fourth mirror 37. The light beams reflected by the fourth mirror 37 pass through an imaging lens 39 of a camera 38 as shown in FIG. 3, and are imaged onto a microfilm (hereinafter briefly termed a "film") F, serving as a recording medium, on a capstan 40.

The capstan 40 is connected to the driving system of the main body of the recording apparatus 11 via a capstan clutch (not shown). The capstan clutch is coupled at the timing of the arrival of the object S at a photographing position, whereby the capstan 40 is rotated to convey the film F. An encoder (not shown), serving as detection means, is connected to the capstan 40, so that the moving amount and the remaining amount of the film F can be detected.

Figure 3:
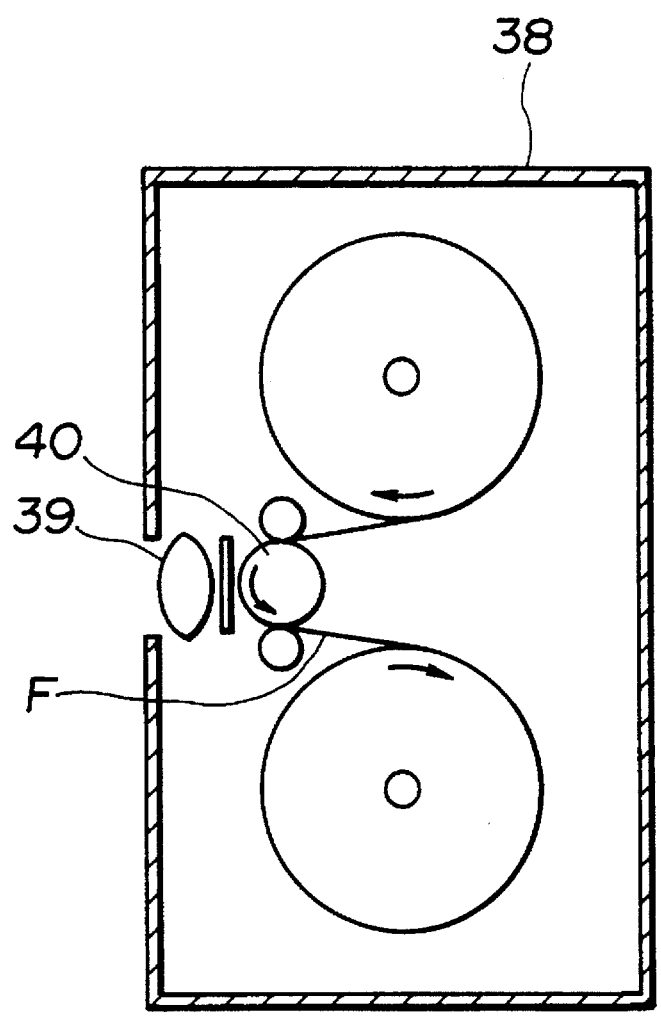
FIG. 3 is a cross-sectional view of a camera unit of the apparatus shown in FIG. 1.

While FIG. 3 illustrates the camera 38, a second camera 45, serving as recording means, has the same configuration as the camera 38. Hence, by switching on and off a capstan clutch (not shown) of camera 45, another microfilm F' (not shown), serving as a recording medium, can be conveyed and stopped.

Each of the cameras 38 and 45 constitutes a camera unit, which is detachably mounted on the main body of the apparatus.

The capstan clutch of the camera 38 and the capstan clutch of the camera 45 are separately provided, so that it is possible to convey only the film F of the camera 38, to convey only the film F' of the camera 45, or to simultaneously convey the film F of the camera 38 and the film F' of the camera 45.

In a second optical system generally indicated as B, as shown in FIG. 2, for projecting images onto the second camera 45, having the same configuration as the first camera 38, the object S is exposed at the same exposure position as in the case of the camera 38. The light beams representing images on the two surfaces of the object S pass through slits 41 and 41', and are reflected obliquely downward by a second mirror 42. The light beams are again reflected upward by a third mirror 43, and are reflected forward by a fourth mirror 44. The light beams reflected by the fourth mirror 44 pass through an imaging lens (not shown) of the camera 45, and are imaged onto the film F' on a capstan.

In the present embodiment having the above-described configuration, a respective light-emitting device for printing a retrieval mark is provided for each of the first optical system A for projecting images of an object onto the first camera 38, and the second optical system B for projecting the images of the object onto the second camera 45.

Figure 4:
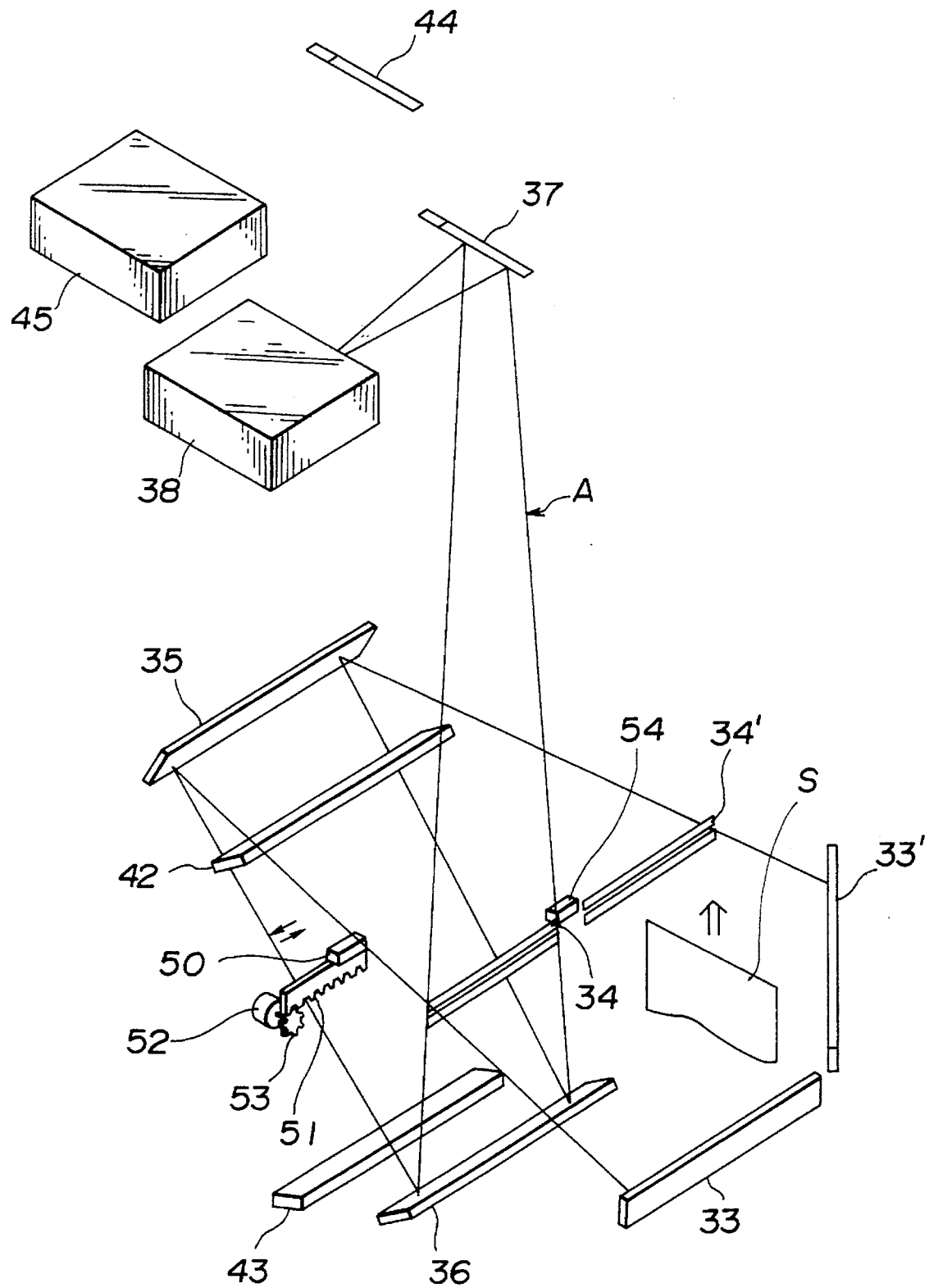
FIG. 4 is a diagram illustrating a first optical system of the apparatus shown in FIG. 1.

That is, FIG. 4 illustrates the first optical system A for projecting images of an object onto the camera 38. In FIG. 4, a light-emitting device 50 is integrated with a rack 51, which meshes with a gear 53 integrated with a pulse motor 52. Hence, by operating the pulse motor 52, the light-emitting device 50 can move in the directions of the arrows shown in FIG. 4. By controlling the light emission of light-emitting device 50, a retrieval mark can be printed on the film F. An LED (light-emitting diode) array 54 for displaying a frame number for the first optical system A comprises a plurality of LEDs. By controlling the timing of LED emission of LED array 54, a frame number can be printed on the film F.

Figure 5:
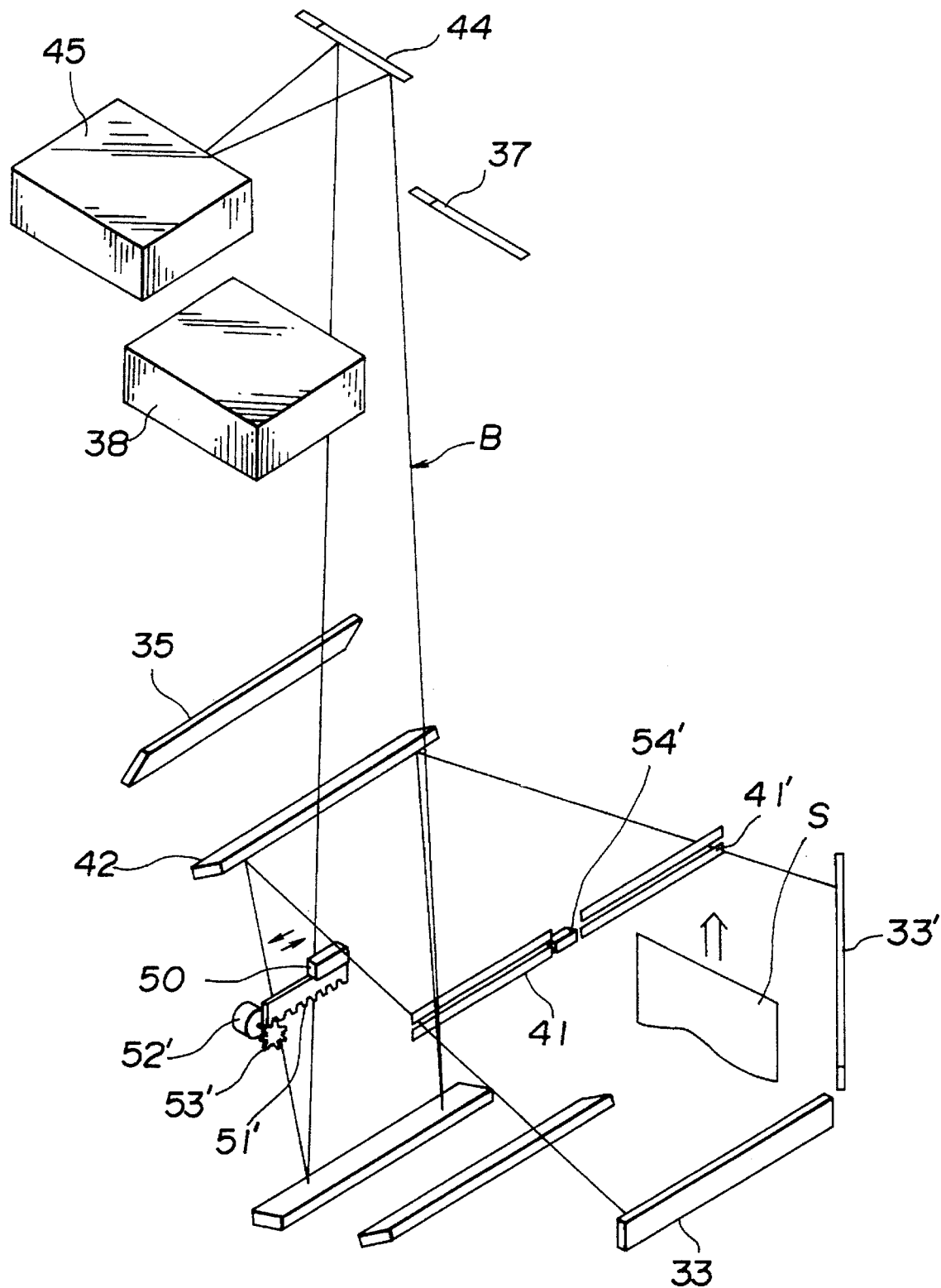
FIG. 5 is a diagram illustrating a second optical system of the apparatus shown in FIG. 1.

FIG. 5 illustrates the second optical system B for projecting images of an object onto the camera 45. In FIG. 5, a light-emitting device 50' is integrated with a rack 51', which meshes with a gear 53' integrated with a pulse motor 52'. By operating the pulse motor 52', the light-emitting device 50' can move in the directions of the arrows shown in FIG. 5. By controlling the light emission of light-emitting device 50', a retrieval mark can be printed on the film F'. An LED array 54' for displaying a frame number for the second optical system B also comprises a plurality of LEDs as the LED array 54. By controlling the timing of LED emission of LED array 54', a frame number can be printed on the film F'.

Figure 14:
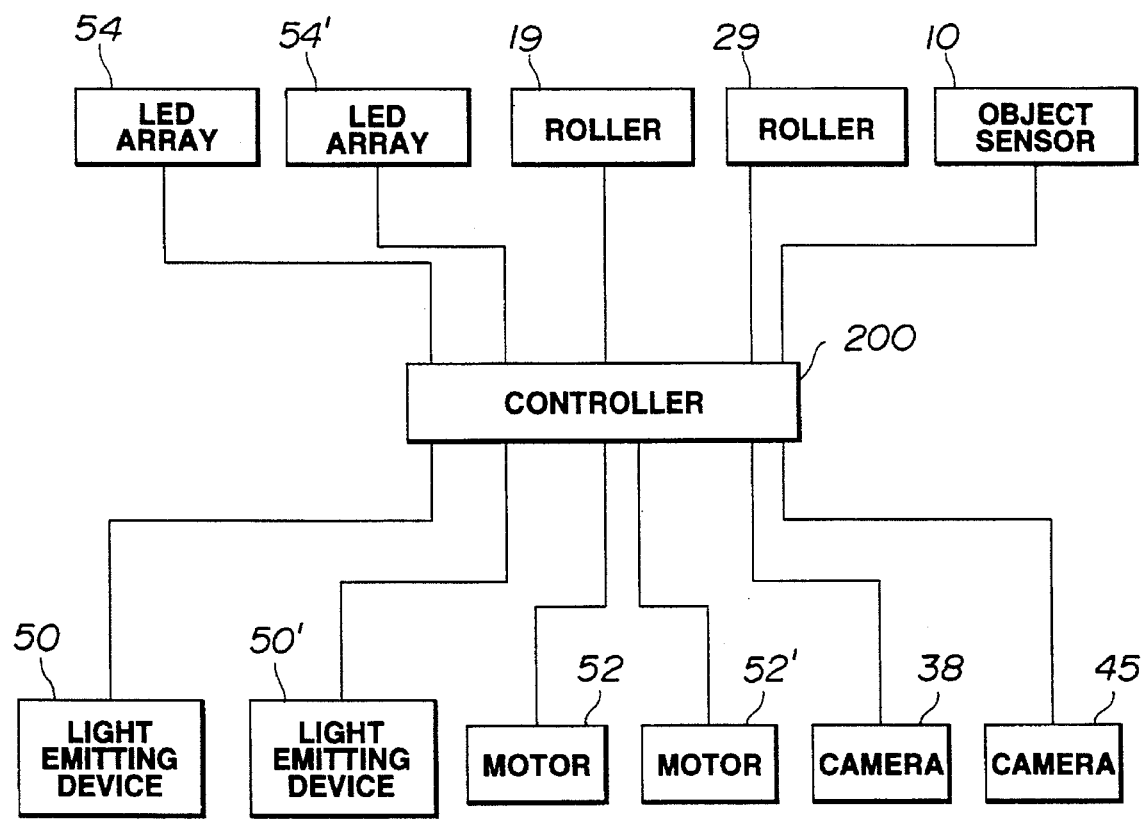
FIG. 14 is a schematic drawing illustrating a control circuit of the present invention.

FIG. 14 is a schematic drawing of a control circuit for controlling the operation of the present invention. In the circuit, controller 200 controls, e.g., pulse motors 52 and 52', light-emitting devices 50 and 50', LED arrays 54 and 54', cameras 38 and 45, roller 19, and roller 29. Controller 200 also receives input signals, e.g., from object sensor 10. Those skilled in the art readily will appreciate numerous circuit configurations suitable for effecting the control steps disclosed herein in accordance with this general control system.

Figure 6:
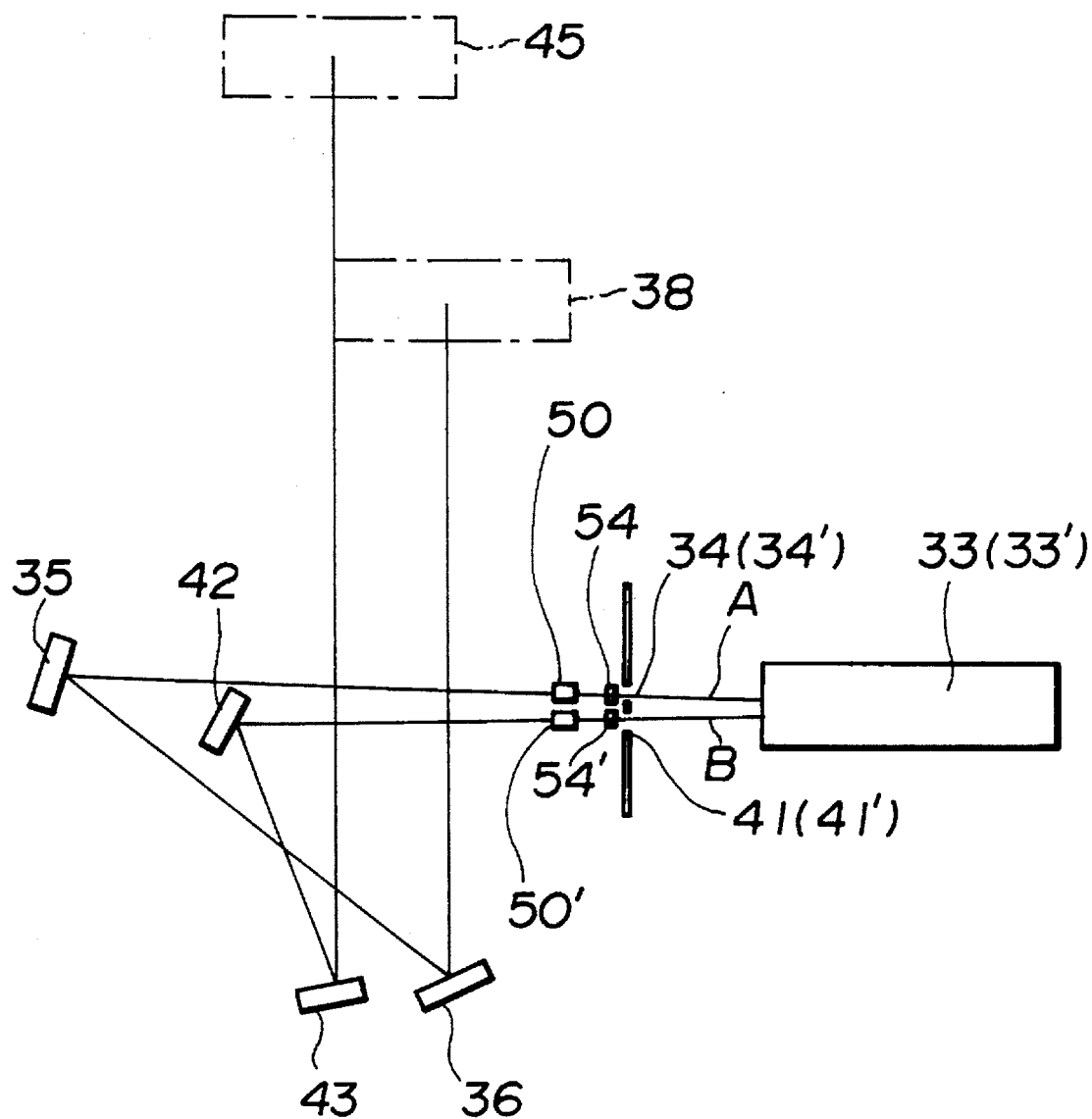
FIG. 6 is a schematic side view of a principal portion of the first and second optical systems.

FIG. 6 illustrates the optical systems A and B, as seen from the longitudinal direction of the mirror 42.

The first optical system A and the second optical system B assume the same position at the exposing portion for the object (not shown), and are branched in upper and lower directions by the slits 34 and 41.

Figure 7:
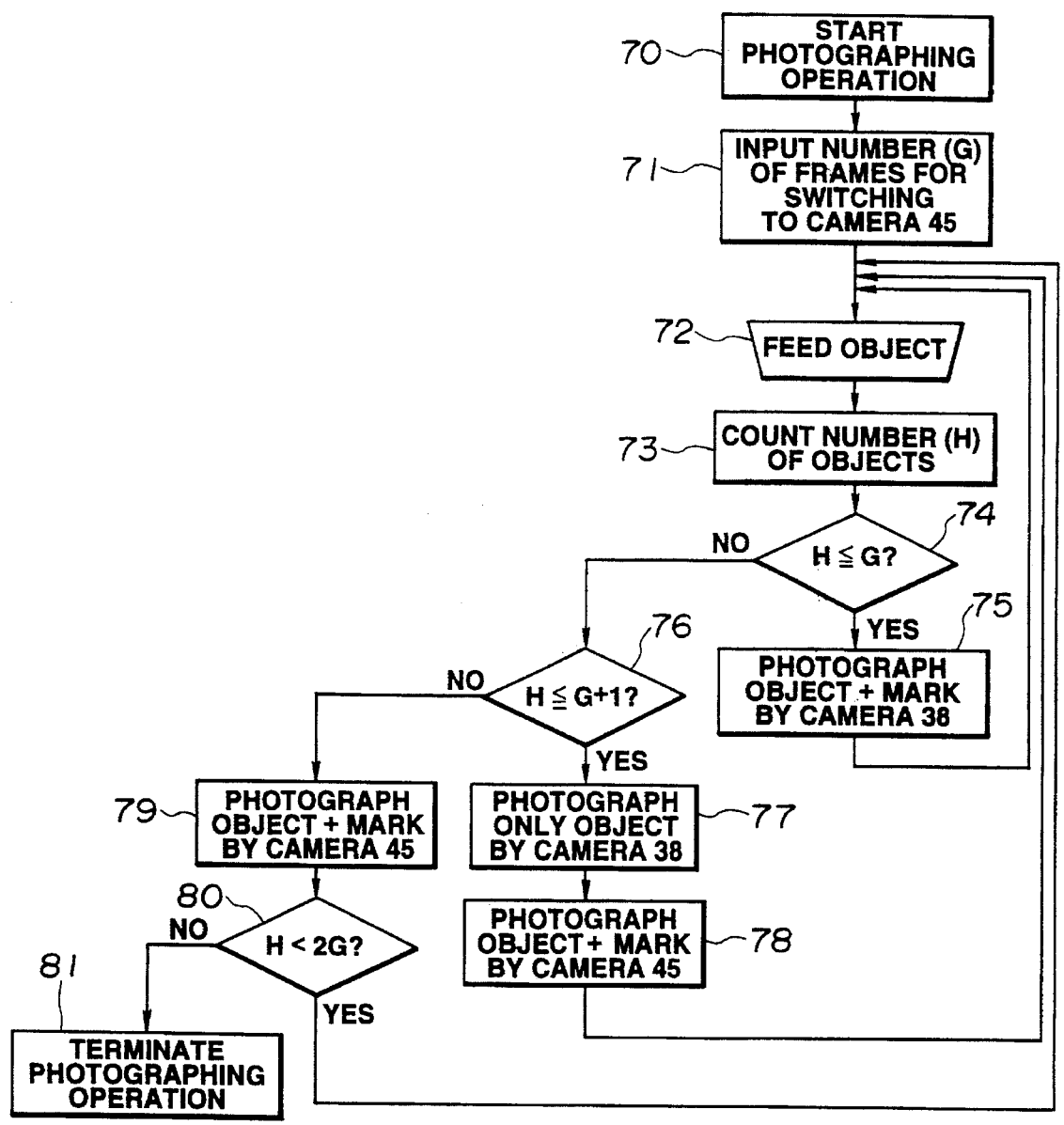
FIG. 7 is a diagram illustrating the operation of the first embodiment.

FIGS. 7 and 8 illustrate the operation of the recording apparatus 11, and photographed films obtained by the recording apparatus 11, respectively.

In FIG. 7, when a photographing operation has been started (operation 70), the number of frames G for switching to the camera 45 is input (operation 71).

When an object S has been fed (operation 72), the number of objects H fed to the photographing position, i.e., the count number of objects, is calculated based on a signal from the object sensor 10 within the main body of the recording apparatus 11 (operation 73).

Next, the object count number H is compared with the camera-switching number G (operation 74). If the object count number H is equal to or less than the camera-switching number G, then the object and a retrieval mark are photographed by the camera 38 (operation 75), and the feeding of the next object is awaited.

If the object count number H exceeds the camera-switching number G, then the object count number H is compared with a value obtained by adding one to the camera-switching number G.

If the object count number H is equal to or less than the value obtained by adding one to the camera-switching number G, then the camera 38 photographs only the object S (operation 77), and the camera 45 photographs the object S and the retrieval mark (operation 78). Thereafter, the recording apparatus 11 assumes a state of waiting for the feeding of the next object.

If the object count number H is greater than the value obtained by adding one to the camera-switching number G (i.e., the number for performing a duplicate photographing operation in which both camera 38 and camera 45 photograph the same object) (operation 76), then the camera 45 photographs the object and the retrieval mark.

Next, the object count number H is compared with twice the camera-switching number G (operation 80). If the object count value H is smaller than twice the camera-switching number G, then the recording apparatus assumes a state of waiting for the feeding of the next object.

If the object count number H is equal to or greater than twice the camera-switching number G, then the photographing operation is terminated (operation 81).

FIGS. 8(A) and 8(B) illustrate films on which images have been photographed according to the flowchart shown in FIG. 7.

A film 82 has images photographed by the camera 38. A film 83 has images photographed by the camera 45.

In order to facilitate explanation, an object count number H is written in for each corresponding object image. For example, object count number H equal to 1 corresponds to object image 84. In this case, the camera-switching number G is set to 30.

When the first object S has been fed, an object image 84 and a retrieval mark 85 are photographed and recorded on the film 82 in the camera 38. When the 30th object S has been fed after sequentially feeding objects S, an object image 86 and a retrieval mark 87 are photographed and recorded.

When the 31st object S has been fed, an image 88 of the 31st object is photographed and recorded on the film 82 in the camera 38 according to operations 74 and 76 shown in FIG. 7. A retrieval mark 90 is photographed and recorded on the film 83 in the camera 45 in addition to an image 89 of the 31st object. In the camera 38, a retrieval mark is not photographed for the image 88 of the 31st object. This can be realized by not illuminating the light-emitting device 50.

As for objects S after and including the 32nd object S, according to operations 74 and 76 shown in FIG. 7, object images and retrieval marks are photographed and recorded on the film 83 in the camera 45, and the photographing operation is terminated at an image 91 of the 60th object S. Objects S after and including the 32nd object are not photographed by the camera 38.

Although in the present embodiment only a duplicate image of an object is photographed by the first camera 38, the final image having a retrieval mark (the object image 86 shown in FIG. 8(A)) may be photographed also by the second camera 45 without providing a retrieval mark.

The number of objects for which duplicate images are photographed and recorded on different films is not limited to one. For example, in operation 76, shown in FIG. 7, the number of objects for duplicate photographing operations may be set to a plural number.

In the above-described embodiment, switching between the cameras is performed based on the number of objects fed to the photographing position. However, switching between the cameras may be performed based on the remaining amount of the film, i.e., the amount of an unphotographed region of the film. A known film-remaining-amount detector may be used for that purpose. When using a film-remaining-amount detector, the operation shown in FIG. 7 is modified to employ remaining-amount detection. In this case, operation 74 is modified to determine if the remaining amount has reached a predetermined amount. In operation 76, it is determined if images of the set number have been photographed.

FIGS. 9(A) and 9(B) illustrate films having images photographed in a second embodiment of the present invention. As shown in FIGS. 9(A) and 9(B), frame numbers 94 corresponding to object images may be controlled between the film 92 in the camera 38 and the film 93 in the camera 45 in the same manner as in the case of the retrieval marks. That is, the same images 30 and 31 are recorded on both of the films 92 and 93, and a retrieval mark and a frame number corresponding to each of images 30 and 31 are recorded only on one of the films.

Figure 10:
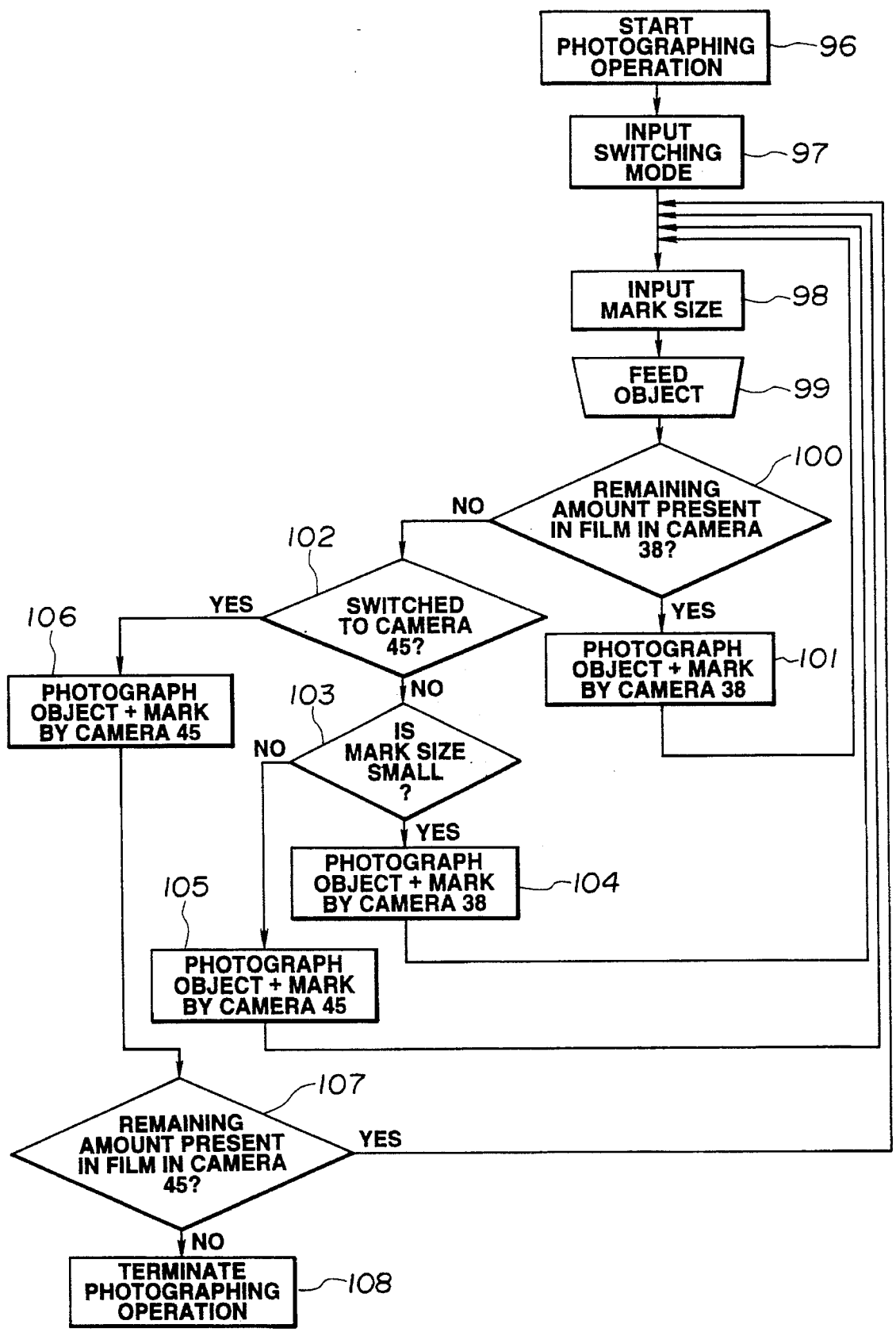
FIG. 10 is a diagram illustrating the operation of a third embodiment of the present invention.
Figure 11A:
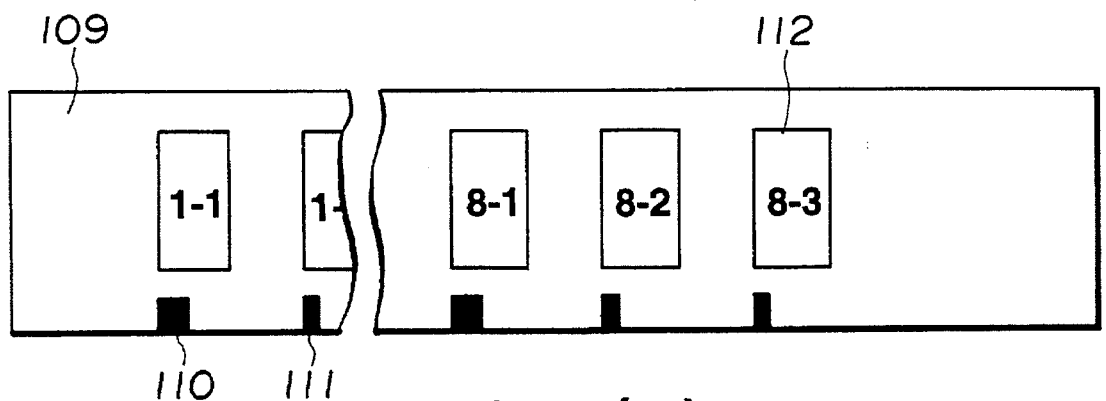
FIGS. 11(A), 11(B), and 11(C) are diagrams illustrating films, on which images are photographed, according to the third embodiment.
Figure 11B:
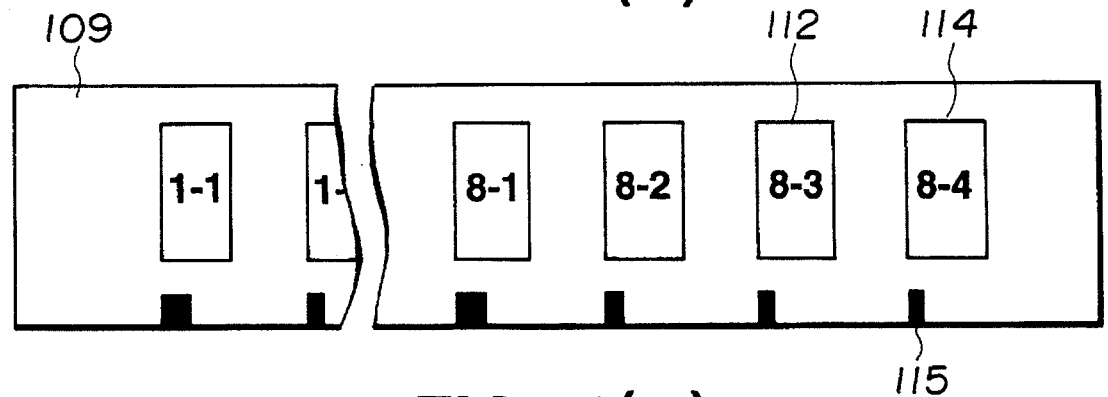
Figure 11C:
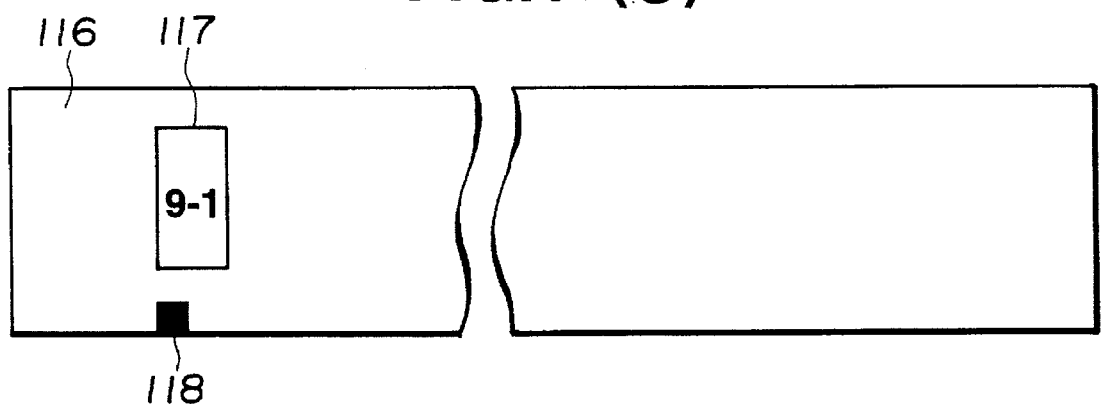
Figure 12:
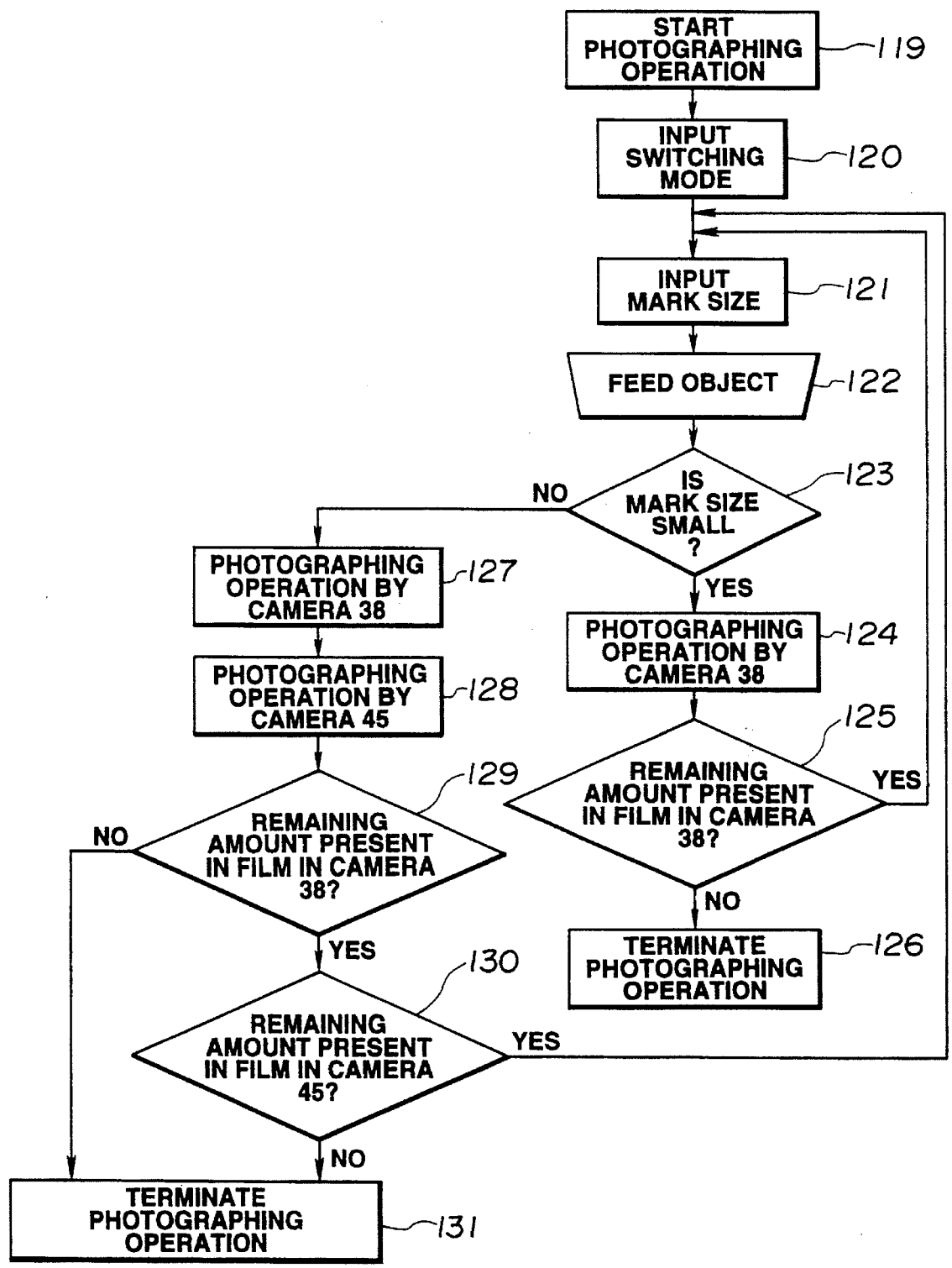
FIG. 12 is a diagram illustrating the operation of a fourth embodiment of the present invention.

FIGS. 10 through 12 illustrate a third embodiment of the present invention which uses the above-described recording apparatus 11.

The operation of the apparatus will now be described with reference to FIG. 10.

When a photographing operation has been started (operation 96), a switching mode is input (operation 97). In the present embodiment, a description will now be provided of a case in which two kinds of retrieval marks, respectively having a large size and a small size, can be recorded, and in which a mode of switching from the camera 38 to the camera 45 is input in response to the retrieval mark having the large size. The mark having the large size is recorded for the leading object of a unit comprising a plurality of objects, and the mark having the small size is recorded for each of any other objects.

Next, the size of the retrieval mark is input, that is, the size of the mark to be recorded is set by inputting either a large size or a small size retrieval mark(operation 98). Then, the object S is fed to the main body of the recording apparatus 11 (operation 99).

The recording apparatus 11 confirms the remaining amount of the film in the camera 38 (operation 100). If the remaining amount of the film is sufficient for performing photographing operations, then the image of the object S and the retrieval mark having the input size are photographed by the camera 38 (operation 101), and the apparatus assumes a state of waiting for the input of the size of the retrieval mark. By repeating the above-described operation, objects, and retrieval marks having input sizes, are sequentially photographed.

If the remaining amount of the film in the camera 38 becomes small in the course of photographing operations, then it is determined in operation 100 that the remaining amount of the film in the camera 38 reaches a predetermined small amount, by means of the film-remaining-amount detector within the camera 38. In operation 102, it is determined if the switching of the photographing operation from the camera 38 to the camera 45 has been completed. If the result of the determination is negative, it is determined in the next operation 103 if the retrieval mark having the small size has been set in operation 98. If the result of the determination is affirmative, then the object image and the retrieval mark having the small size are photographed by the camera 38 (operation 104), and the apparatus assumes a state of waiting for the input of the mark size for the next photographing operation. The photographing operation by the camera 38 is continued when the retrieval mark having the small size is set, for the following reason. That is, an object having a retrieval mark of the small size belongs to a unit of objects being photographed by the camera 38. One unit of objects must be photographed on the same film, and must not be photographed on another film. Since it can be usually assumed that the number of remaining objects is small, the remaining objects can be photographed on the same film, even if the remaining amount of the film is small. In such a case, the remaining amount of the film is set to a few frames.

If the result of the determination in operation 103 is negative, that is, if a retrieval mark having the large size is set, then the object image and a retrieval mark having the large size are photographed by the camera 45 (operation 105), and the apparatus assumes a state of waiting for the input of the mark size for the next photographing operation. The setting of a retrieval mark having the large size indicates that the leading object of a unit of objects must be photographed. In such a case, by switching to a photographing operation by the camera 45, the unit of objects can be recorded on the film in the camera 45.

Once a photographing operation has been performed by the camera 45, it is determined in operation 102 that the camera performing photographing operations has been switched from the camera 38 to the camera 45. In subsequent photographing operations, object images and retrieval marks are photographed by the camera 45 in operation 106. The photographing operation is repeated until it is determined in operation 107 that there is no remaining amount of the film in the camera 45.

When it has been determined in operation 107 that there is no remaining amount of the film, the photographing operation is terminated in operation 108.

FIGS. 11(A) through 11(C) illustrate films on which images and retrieval marks have been photographed and recorded according to the operations described with reference to FIG. 10.

A film 109 shown in FIG. 11(A) is a film on which images and retrieval marks have been photographed and recorded by the camera 38. Large-size marks 110 and small-size marks 111 are photographed and recorded on the film 109 together with object images. Images 8-1, 8-2 and 8-3 represent one unit of objects. The image 8-1 having the large-size mark represents the leading object of the unit. It is assumed that it has been detected that the remaining amount of the film 109 is small at the final image 112.

The film 109 in the camera 38 shown in FIG. 11(B) illustrates a state in which after photographing the final image 112, the mark size has been set to the small size, and the next object has been fed.

As described with reference to FIG. 10, after detecting that the remaining amount of the film in the camera 38 is small (operation 100), and confirming that the mark size is set to the small size (operation 103), an object image 114 and a retrieval mark 115 having the small size are photographed next to the final image 112 by the camera 38 (operation 104).

A film 116 shown in FIG. 11(C) is a film in the camera 45 when the mark size has been set to the large size and an object has been fed, in a state in which the final image 112 has been photographed.

As described with reference to FIG. 10, after detecting that the remaining amount of the film in the camera 38 is small (operation 100), and confirming that the mark size is set to the large size (operation 103), an object image 117 and a retrieval mark 118 having the large size are photographed by the camera 45 (operation 105). An image 9-1 represents the leading object of a unit of objects. The mark having the large size is utilized in a retrieval apparatus in order to retrieve the leading image of each of a plurality of units of objects recorded on films.

In the present embodiment, images are photographed without being overlapped using a plurality of cameras. However, as described with reference to FIGS. 7 through 9, the photographing operation may be switched between cameras in a state in which object images are photographed while being overlapped, and a mark is recorded only on one film without being overlapped.

In the present embodiment, any other marks, such as bar codes or the like, than the marks having the large and small sizes may also be used, provided that images can be identified as with the above-described marks. For example, the marks may comprise at least three different marks.

FIGS. 12 and 13 illustrate a fourth embodiment of the present invention which uses the above-described recording apparatus 11.

A description will now be provided of the operation of the apparatus with reference to FIG. 12.

A photographing operation is started (operation 119), and a switching mode is input (operation 120). In the present embodiment, a description will be provided of a case including the modes of (i) usually photographing images by the camera 38, and (ii) photographing an image by each of the cameras 38 and 45 if a large mark is present.

Next, the size of the retrieval mark is input to set the size of the mark to be recorded (operation 121), and an object is fed to the main body of the apparatus 11 (operation 122).

The main body of the apparatus 11 confirms the mark size (operation 123). If the mark size is set to a small size, an image is photographed by the camera 38 (operation 124), and the remaining amount of the film in the camera 38 is confirmed (operation 125).

If the remaining amount of the film is sufficient, then the apparatus assumes a state of waiting for the input of the size of the retrieval mark. If there is no remaining amount of the film, then the photographing operation is terminated (operation 126).

If the mark size is set to the large size as a result of the confirmation of the mark size (operation 123), then a photographing operation is performed by the camera 38 (operation 127) as well as by the camera 45 (operation 128).

Thereafter, the remaining amount of the film in the camera 38 is confirmed (operation 129), and the remaining amount of the film in the camera 45 is confirmed (operation 130). If there is no remaining amount of the film in either of cameras 38 and 45, then the photographing operation is terminated (operation 131). If the remaining amount of the film is sufficient ("yes" in each of operation 129 and operation 139), then the apparatus assumes a state of waiting for the input of a mark size.

Figure 13A:
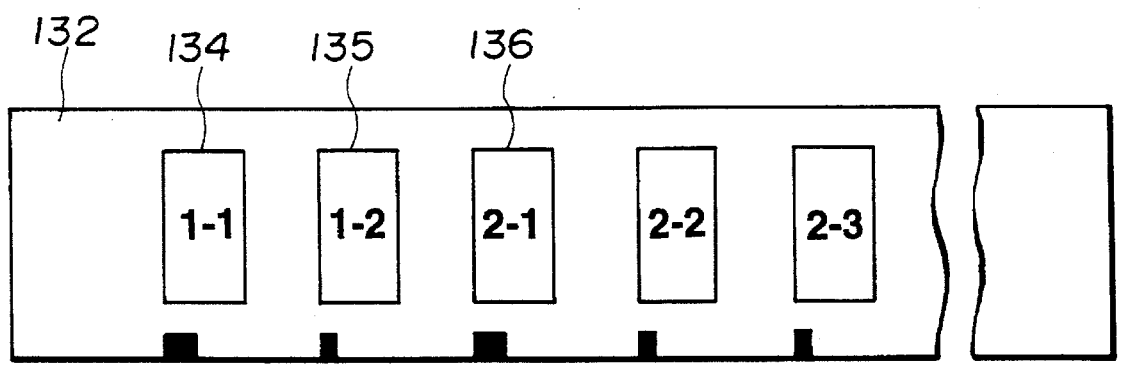
FIGS. 13(A) and 13(B) are diagrams illustrating films on which images are photographed according to the fourth embodiment.
Figure 13B:
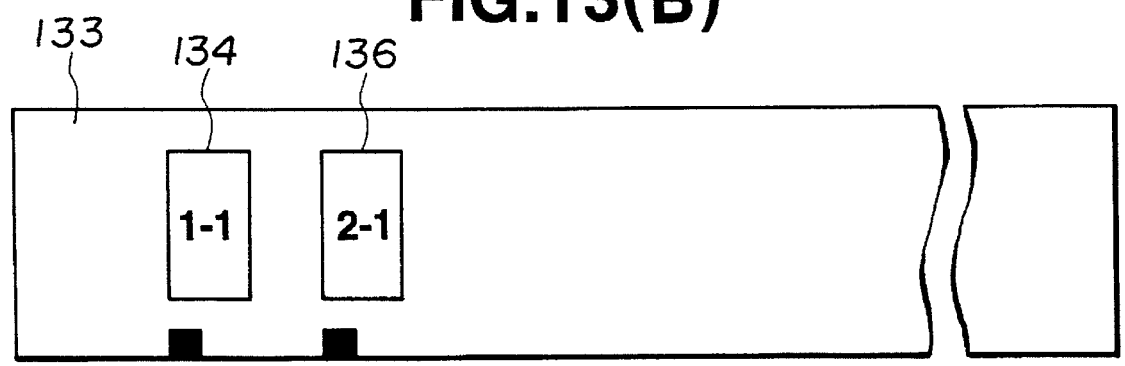

FIGS. 13(A) and 13(B) illustrate films on which images have been photographed and recorded by the operation described with reference to FIG. 12.

A film 132 is a film on which images have been photographed by the camera 38. A film 133 is a film on which images have been photographed by the camera 45.

A description will now be provided of a case in which an object S is actually fed. First, a description will be provided of a case in which a retrieval mark having the large size has been set and an object S has been fed. In operation 123 shown in FIG. 12, the set size of the retrieval mark is determined, and the object S is photographed by the camera 38 (operation 127) as well as by the camera 45 (operation 128).

That is, an image 134 of the first object is photographed on each of the film 132 in the camera 38 and the film 133 in the camera 45.

Next, a description will be provided of a case in which an object, for which the mark having the small size is set, has been fed as the second object. In operation 123 shown in FIG. 12, the size of the retrieval mark is determined, and the object is photographed only by the camera 38 (operation 124).

At that time, an image 135 of the second object is photographed only on the film 132 in the camera 38, and is not photographed on the film 133 in the camera 45.

Next, a description will be provided of a case in which an object S, for which the mark having the large size has been set as in the case of the first object, has been fed as the third object S. In this case, an image 136 of the third object is photographed on each of the film 132 in the camera 38 and the film 133 in the camera 45 as in the case of the first object.

In the present embodiment, a description has been provided of a case in which images of objects, i.e., only those objects for which the retrieval mark having the large size has been set, are photographed by a plurality of cameras. However, retrieval marks having large, medium, and small sizes may be used. When the retrieval mark having the large size has been assigned, images of all objects may be photographed by a plurality of cameras until a retrieval mark having the medium size is thereafter assigned. When a mark having the medium size has been assigned, images only of the object (corresponding to the medium size retrieval mark) may be photographed by the plurality of cameras. Alternatively, images of the next object having the retrieval mark having the large size may be photographed.

Although in the foregoing embodiments a description has been provided of the case of using microfilms, the present invention may also be applied to an electronic filing apparatus in which digitized images are recorded on optical disks or magnetooptical disks.

In such an electronic filing apparatus, the same CCD may be used as a photographing unit, and a plurality of recording media (such as magnetic tapes or magnetooptical disks) may be used for recording images.

Although in the present invention a description has been provided of methods of switching the recording operation between recording media using retrieval marks, the switching may be performed by performing a particular operation or reading mark data, instead of using the retrieval marks.

As described above, in a recording apparatus including a plurality of recording media and a plurality of recording means for recording images on the respective recording media, by providing means for sequentially recording images on one recording medium and performing switching so as to perform image recording on the one recording medium as well as on another recording medium after recording a predetermined amount of images, the same image can be recorded on each of the two recording media, and recording of an image on the one recording medium can be confirmed by an image on the other recording medium. Hence, the apparatus is very convenient to use, and the control of recording media is facilitated. In addition, the connection between two recording media can be easily confirmed.

When recording the same image on each of a first recording medium and a second recording medium, by providing means for performing recording without overlapping retrieval information for the same image, the connection between the recording media when the recording operation is switched between them can be visually confirmed by images on the respective recording media. Furthermore, since the retrieval information is not overlapped for the same image, it is possible to retrieve images from the first recording medium and the second recording medium as if the first and second recording media constitute a single continuous medium.

The individual components shown in outline or designated by blocks in the drawings are all well known in the recording apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus for recording images on a plurality of recording media, said apparatus comprising:

image recording means for recording images on the plurality of recording media; and control means for controlling said image recording means to sequentially record images on one recording medium of the plurality of recording media, and for controlling said image recording means to record at least one image on each of the one recording medium and at least one other recording medium of the plurality of recording media after recording a predetermined number of images on the one recording medium.

2. A recording apparatus according to claim 1, further comprising:

second recording means for recording retrieval information on the plurality of recording media, wherein said control means controls said image recording means and said second image recording means so as to sequentially record images and retrieval information on the one recording medium, and, after recording of the predetermined number of images on the one image recording medium, to (i) record a next sequential image and retrieval information on another recording medium of the plurality of recording media, and (ii) record the next sequential image on the other recording medium without recording the retrieval information.

3. A recording apparatus according to claim 2, wherein said second recording means records retrieval information comprising an address of an image.

4. A recording apparatus according to claim 2, wherein said second recording means records retrieval information comprising a mark.

5. A recording apparatus according to claim 2, wherein said second recording means records a plurality of types of retrieval information.

6. A recording apparatus according to claim 1, wherein said image recording means comprises:

a plurality of camera units, each camera unit comprising (i) a recording medium and (ii) means for conveying the recording medium; and optical systems for projecting images onto the recording media within the plurality of camera units.

7. A recording apparatus according to claim 6, wherein each of said plurality of camera units is detachable with respect to a main body of said apparatus.

8. A recording apparatus according to claim 6, wherein each of said plurality of camera units comprises an imaging lens.

9. An apparatus according to claim 1, wherein at least one of the plurality of recording media comprises an optical disk.

10. An apparatus according to claim 1, wherein at least one of the plurality of recording media comprises a magnetooptical disk.

11. A recording apparatus for recording images on a plurality of recording media, said apparatus comprising:

image recording means for recording images on the plurality of recording media; and control means for controlling said image recording means to sequentially record images on one recording medium of the plurality of recording media, and for controlling said image recording means to record a next sequential image on each of the one recording medium and another recording medium of the plurality of recording media after a remaining amount of an unrecorded region of the one recording medium has reached a predetermined amount.

12. A recording apparatus according to claim 11, further comprising second recording means for recording retrieval information on the plurality of recording media, wherein said control means control said image recording means and said second recording means so as to sequentially record images and retrieval information on the one recording medium, and, after the remaining amount of the unrecorded region of the one reording medium has reached the predetermined amount, to (i) record the next sequential image and retrieval information on another recording medium of the plurality of recording media, and (ii) record the next sequential image on the one recording medium without recording the retrieval information.

13. A recording apparatus according to claim 11, further comprising:

original conveying means for conveying an original, and recording medium conveying means for conveying a recording medium, wherein said image recording means records an image of an original on a recording medium while the original and the recording medium are conveyed by said original conveying means and said recording medium conveying means, respectively.

14. A recording apparatus according to claim 13, wherein the recording medium comprises a roll microfilm.

15. A recording apparatus according to claim 12, further comprising:

original conveying means for conveying an original, and recording medium conveying means for conveying a recording medium, wherein said image recording means records an image of an original on a recording medium while the original and the recording medium are conveyed by said original conveying means and said recording medium conveying means, respectively.

16. A recording apparatus according to claim 15, wherein the recording medium comprises a roll microfilm.

17. A recording apparatus for recording images on a plurality of recording media, said apparatus comprising:

first recording means for recording images on the plurality of recording media;

second recording means for recording retrieval information on the plurality of recording media; and control means for controlling said first and second recording means so as to sequentially record images and retrieval information on one recording medium of the plurality of recording media, and, after a remaining amount of an unrecorded region of said one recording medium has reached a predetermined amount, to (i) record at least one image on each of said one recording medium and another recording medium of the plurality of recording media, and (ii) to selectively record the retrieval information on either said one recording medium or said another recording medium.

18. A recording apparatus for recording images on at least two recording media, said apparatus comprising:

optical means for projecting an image onto at least one of the at least two recording media; and control means for controlling said optical means so as to sequentially project images on one recording medium of the at least two recording media, and for performing switching of said optical means so as to project a next sequential image onto each of the one recording medium and another of the at least two recording media when a remaining amount of a recordable region of the one recording medium has reached a predetermined amount.

19. An apparatus according to claim 18, further comprising:

recording means for recording retrieval information on the recording media; and recording control means for controlling said recording means so as to record retrieval information for the next sequential image on the one recording medium.

* * * * *